Dec. 10, 1935. W. A. PHILLIS 2,024,111
SAW GUIDE AND CLAMP
Filed Oct. 24, 1932
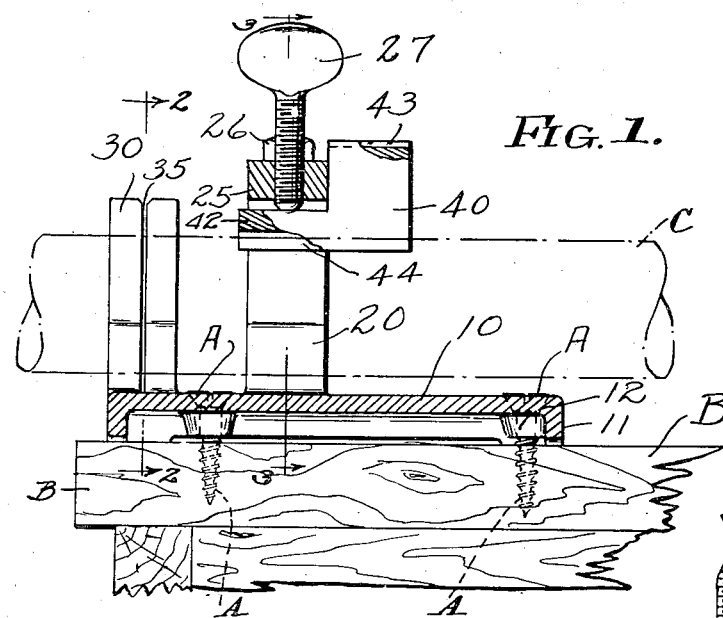
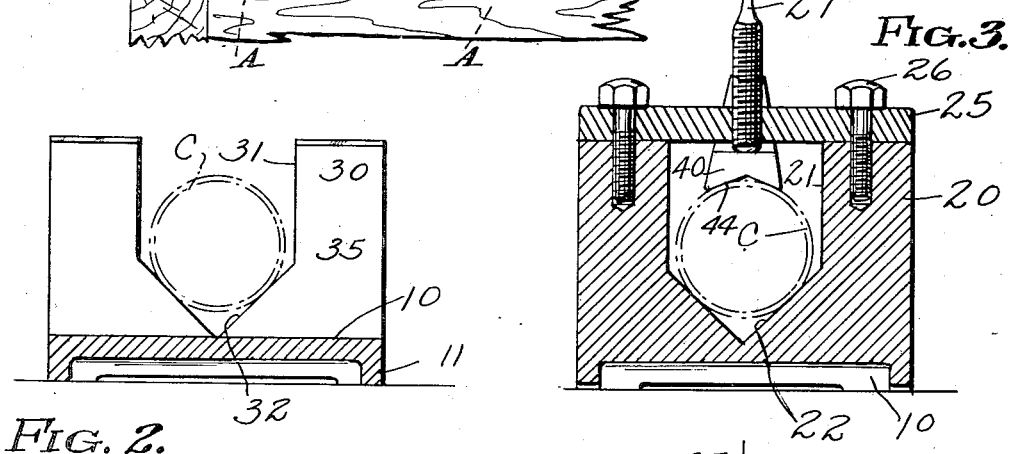
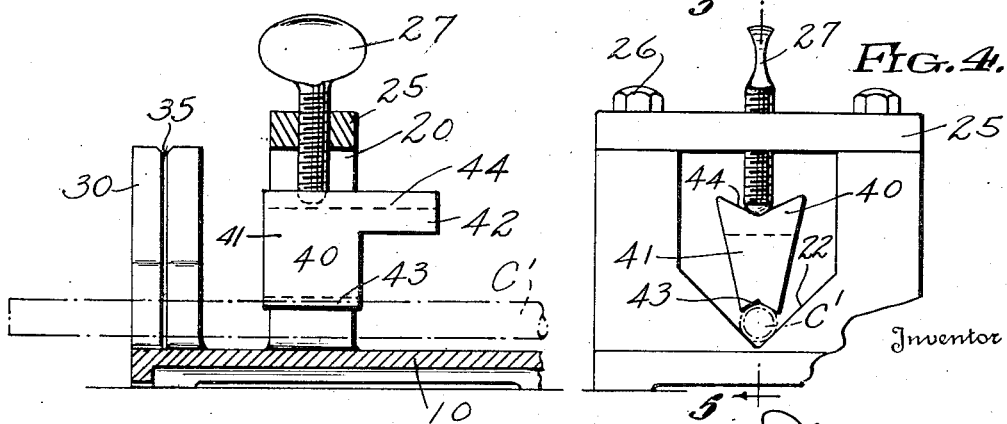

Patented Dec. 10, 1935

2,024,111

UNITED STATES PATENT OFFICE 2,024,111

SAW GUIDE AND CLAMP

William A. Phillis, Warren, Ohio, assignor to Beaver Pipe Tools, Incorporated, a corporation of Ohio Application October 24, 1932, Serial No. 639,259

2 Claims. (Cl. 29—67)

This invention relates to a simple device for holding a pipe and guiding a saw blade in a plane at right angles to the axis of the pipe, so that the pipe may be cut, readily and accurately. Of recent date, thin walled copper tubing has come into use as a substitute for iron pipe, but it has been found impracticable to clamp such tubing in an ordinary pipe vise or to cut it with an ordinary pipe cutter, as both the vise and the cutter distort the pipe. Such tubing may be cut by a hack-saw, and it has been the custom to hold the tube by hand while sawing it off, but this operation is inaccurate and unless the cut is strictly at right angles to the axis of the tube, there is difficulty in properly coupling the tubing when installing it.

My invention provides a device adapted to readily center pipes or tubes of various sizes, and hold such article in place without injuring it; at the same time properly guide a saw blade, so that the article may be cut accurately at right angles to its axis. The invention is concerned primarily with means for enabling the device to hold pipes or tubes of a wide range of diameters. Reference is made to my copending application No. 754,263, filed November 29, 1934, for protection on the structure independently of this particular feature.

My invention, comprising a clamping and guiding device, is illustrated in the drawing hereof, and is hereinafter more fully described, and the essential novel features are summarized in the claims.

In the drawing, Fig. 1 is a longitudinal vertical section of the clamping and guiding device; Figs. 2 and 3 are transverse sections through the clamping and saw-guiding walls respectively, as indicated by the correspondingly numbered lines on Fig. 1; Fig. 4 is an end view of a device looking from the left-hand end of Fig. 1, showing the clamping block in position for small-size pipe; and Fig. 5 is a longitudinal section on the line 5—5 of Fig. 4.

In the different views "10" indicates the base of my device, "20" the clamping wall carried thereby, and "30" the saw-guiding wall. The base may be in the form of a flat plate, preferably having down-turned edges 11, and suitable bosses 12 may be provided to receive screws A to secure the device to the bench B. The upstanding walls 20 and 30 are rigid with the base. The base and these walls may accordingly, if desired, be a single integral casting, preferably of steel.

The clamping wall 20 is provided with a notch 21 leading downwardly from its top, having parallel edges terminating in a V-shaped bottom 22. This wall carries a suitable clamp. I have shown for this purpose a thumb-screw 27 threaded in a bridge 25, mounted on top of the wall and secured by cap screws 26. When this thumb-screw is turned down it may bind the pipe, indicated by C or $C^1$, against the V-shaped seats in the two walls.

The guiding wall 30 is parallel to the wall 20 and has a similar notch 31 in it, terminating in a V-shaped bottom 32, these two notches 21 and 31 being in longitudinal alignment. Along the middle of the wall 30 is the vertical guiding kerf 35, which is of a size to receive a saw blade.

It will be seen that a pipe or tube lying in the two notches 21 and 31 will center itself by reason of the V-shaped bottoms irrespective of the size of the tube, as indicated by the larger tubes C of Figs. 1 to 3, and the smaller tubes $C^1$ of Figs. 4 and 5.

The set-screw 27 may be long enough to engage all sizes of pipe and its inner end may directly contact with the pipe. However, to enable the use of a shorter set screw and require less turning of it for widely different sizes of pipe, as well as to distribute the pressure, I may employ the intermediate block 40. This block is L-shaped, having a portion 41 of considerable thickness and a portion 42 materially thinner. In the opposite ends of the block are shallow, V-shaped notches, indicated at 43 and 44.

When a comparatively large pipe C is to be clamped, the block 40 may be in the position indicated in Figs. 1 and 3, the set-screw bearing on the portion 42 of the block, and the notch 44 resting on the pipe. On the other hand, when the comparatively small pipe $C^1$ is to be clamped, the block may be turned the other end up, and the groove 43 engage the pipe, the set screw acting in the groove 44, as shown in Figs. 4 and 5. It will be noticed that the sides of the block 40 taper inwardly toward the high portion which has the groove 43. This is so that the walls will not be in the way of the V-shaped bottom 22 when a very small pipe is clamped, as shown in Fig. 4. When the larger pipe is clamped, the wider portion of the block 40 engages the pipe as shown in Fig. 3. In either case the end of the block distributes the pressure of the screw over a considerable area of the pipe, a sufficient arcuate extent being engaged by the block to cause the pipe to be effectively held by a comparatively light pressure caused by the thumb-screw.

By employing a thumb-screw with a comparatively small head, rather than a device with a lateral handle, or a wrench attachment, there is little chance of the user employing sufficient force to injure the tube even though the latter have a very thin wall. The light force resulting from manipulation of the thumb-screw is amply sufficient to hold the pipe in place, so that it may be readily sawed off by the manual operation of a hack-saw.

While my device is primarily intended as a bench attachment, it may be employed without being secured to a bench or, in case of emergency, may be mounted on an installed pipe, which is to be cut off, the removal and replacement of the cap-screws 26 enabling the device to be placed on such pipe and serving to guide the hack-saw for the cutting of the pipe.

Experience with my device has demonstrated that it is very useful in enabling the proper cutting of thin walled copper tubing, which has heretofore been difficult of ready handling. The device is also useful for the cutting of nickel-plated pipe for bath-room installation, for instance, where it is important not to mar the pipe.

It will be noticed that by spacing the saw guide some distance from the clamp as illustrated in the drawing, not only is there clearance on each side of the saw to facilitate the removal of the chips, but, the clamping pressure and sawing pressure being in separated regions, there is no danger of their combined pressure distorting the thin-walled tubing. Furthermore, by this means I obtain centering engagement at spaced lengths of the pipe, so that there is no possibility of the pipe skewing in its seat or assuming any other position than at right angles to the saw guide.

I claim:

1. In a saw guiding device of the type having a base and a transverse saw guide mounted thereon, the combination of a clamping device carried by the base, a V-shaped seat on which the clamping device may clamp the article, said clamping device including a stepped block, the outer face of each step having a V-notch therein, and a set screw adapted to engage the different steps to enable substantially the same position of the set screw to clamp different sizes of tubes resting on the V-shaped seat.

2. In a device of the character described, having a base, a pair of parallel walls rigid therewith and rising vertically, and one having a kerf for guiding the saw, and each wall having a notch with a V-shaped bottom, a bridge across the wall which does not have the kerf, a set screw threaded in said bridge, and a stepped block adapted to be located between the screw and a tube to be clamped and having notched outer faces for engaging different sizes of tubes according to the step of the block engaged by the screw.

WILLIAM A. PHILLIS.